(12) United States Patent
Chou et al.

(10) Patent No.: US 6,269,881 B1
(45) Date of Patent: Aug. 7, 2001

(54) OIL RECOVERY METHOD FOR WAXY CRUDE OIL USING ALKYLARYL SULFONATE SURFACTANTS DERIVED FROM ALPHA-OLEFINS AND THE ALPHA-OLEFIN COMPOSITIONS

(75) Inventors: Shang Chou, Fullerton; Curtis B. Campbell, Hercuies, both of CA (US)

(73) Assignees: Chevron U.S.A. Inc; Chevron Chemical Company LLC, both of San Francisco, CA (US)

( * ) Notice: Subject to any disclaimer, the term of this patent is extended or adjusted under 35 U.S.C. 154(b) by 0 days.

(21) Appl. No.: 09/466,243

(22) Filed: Dec. 17, 1999

Related U.S. Application Data

(60) Provisional application No. 60/113,420, filed on Dec. 22, 1998.

(51) Int. Cl.$^7$ .............................. B01F 17/00; E21B 43/22
(52) U.S. Cl. .................................. 166/270.1; 166/305.1; 507/259; 507/904
(58) Field of Search ................. 166/263, 270.1, 166/275, 305.1; 507/135, 259, 904, 935

(56) References Cited

U.S. PATENT DOCUMENTS

| | | | | |
|---|---|---|---|---|
| 3,601,198 | * | 8/1971 | Ahearn et al. | 507/259 X |
| 3,858,656 | * | 1/1975 | Flournoy et al. | 507/259 X |
| 3,933,201 | * | 1/1976 | Kerfoot et al. | 507/259 X |
| 3,939,911 | | 2/1976 | Maddox et al. | 166/274 |
| 4,194,565 | | 3/1980 | Kalfoglou | 166/275 |
| 4,287,902 | * | 9/1981 | McClaflin et al. | 507/259 X |
| 4,452,708 | * | 6/1984 | Aldrich et al. | 507/259 |
| 4,608,204 | * | 8/1986 | Lew et al. | 507/259 X |
| 4,699,214 | * | 10/1987 | Angstadt | 507/303 |
| 4,743,385 | * | 5/1988 | Angstadt et al. | 166/270.1 X |
| 4,891,155 | * | 1/1990 | Fernley et al. | 507/259 X |
| 4,932,473 | * | 6/1990 | Borchardt | 166/305.1 X |
| 6,022,834 | * | 2/2000 | Hsu et al. | 507/259 |
| 6,043,391 | * | 3/2000 | Berger et al. | 507/259 X |

FOREIGN PATENT DOCUMENTS

| | | |
|---|---|---|
| 0 177 098 | 12/1989 | (EP) . |
| 2 557 198 | 12/1984 | (FR) . |
| 1 087 337 | 10/1967 | (GB) . |
| 2 165 280 | 4/1986 | (GB) . |
| 99/05241 | 2/1999 | (WO) . |

OTHER PUBLICATIONS

Malmberg, E. "Large Scale Samples of Sulfonates for Laboratory Studies in Tertiary Oil Recovery: Preparation and Related Studies, Final Report" USDOE Report No. FE–2605–20, Jan. 1979.

Malmberg, Earl W. et al., "Characterization and Oil Recovery Observations on a Series of Synthetic Petroleum Sulfonates," SPEJ (Apr. 1982) pp. 226–236.

Comberiati, J.R., et al., "Increasing the EOR Activity of Certain Synthetic Alkylaryl Sulfonates," GUS DOE/ DOE–METC/TRP–83–3, Nov. 1982.

Shah, D.O. et al., "Improved Oil Recovery by Surfactant and Polymer Flooding" (Academic Press, 1977) pp. 383–437.

* cited by examiner

*Primary Examiner*—George Suchfield
(74) *Attorney, Agent, or Firm*—A. Stephen Zavell

(57) ABSTRACT

An oil recovery process is disclosed which uses a particular class of alkylaryl sulfonate surfactants. The surfactants are derived from an alpha-olefin stream having a broad distribution of even carbon numbers ranging from 12 to 58. The olefin stream is reacted with aromatic feedstock, such as benzene, toluene, xylene, or a mixture thereof to form alkylates, and then reacted with SO3 to form sulfonic acids. The resulting surfactant has high solubilization and ultra-low interfacial tension with crude oils, especially waxy crude oil, having a broad distribution of carbon numbers.

13 Claims, No Drawings

OIL RECOVERY METHOD FOR WAXY CRUDE OIL USING ALKYLARYL SULFONATE SURFACTANTS DERIVED FROM ALPHA-OLEFINS AND THE ALPHA-OLEFIN COMPOSITIONS

This application claims priority from and the benefit of U.S. Provisional Application Serial No. 60/113,420 filed Dec. 22, 1998. The specification of which is incorporated herein by reference for all purposes.

FIELD OF INVENTION

The present invention is directed to enhanced oil recovery. More specifically, the present invention is directed to enhanced oil recovery of a waxy crude using alkylaryl sulfonate surfactants.

BACKGROUND OF THE INVENTION

Alkylaryl sulfonates have been recognized as promising for enhanced oil recovery by surfactant floods. They can be manufactured in large quantities and can generate low interfacial tensions with oils under favorable conditions, see Malmber, E. "Large scale sulfonates for laboratory studies in tertiary oil recovery:preparation and related studies, final report" USDOE report No. FE-2605-20, May 1979. Much of the efforts have been to develop unique, monomerically pure surfactants for light oils, see Malmber, E. W. et. Al., "Characterization and oil recovery observations on a series of synthetic petroleum sulfonates," SPEJ (April 1982) 226–236; and Comberiati, J. R., et. Al., "Increasing the EOR activity of certain synthetic alkylaryl sulfonates," DOE/METC/TRP-83-3, November 1982.

While pure alkylaryl sulfonates, such as hexadecyl benzene sulfonate, can generate adequate phase behavior and low interfacial tension with light alkanes, they are unsatisfactory when dealing with heavier crude oils, particularly those with a high wax content. They do not form normal phase behavior when mixed with crude oil and brine of varying salinity. At low salinity, surfactant predominantly stays in the aqueous phase, forming a lower-phase microemulsion; at high salinity the surfactant predominantly stays in the oil phase, forming an upper-phase microemulsion. As noted in *Improved Oil recovery by Surfactant and Polymer Flooding*, Academic Press, 1977, normally, a surfactant-oil-brine system that has high oil recovery potential exhibits a lower- to middle- to upper-phase microemulsion transition as salinity increases. Near the mid-range salinity, often termed optimal salinity, a middle-phase microemulsion forms with appreciable amount of oil and brine solubilized in the microemulsion phase. However, if the oil contains a significant fraction of wax, the above phase transition often does not occur and the solubilization capacity is low, resulting in high interfacial tension and poor oil recovery capability.

Additionally and especially with low oil prices, the surfactant must be cost effective. Prior methods which use narrow selections of carbon chain lengths increase the cost because of the large quantities of unsuitable byproducts and/or the need for more tightly controlled reactor conditions or specialized catalysts.

Thus highly desirable would be to have a recovery process and composition useful in waxy crudes. Also desirable would be to have a composition which usefully includes a broad spectrum of carbon chain lengths so substantially complete production runs can be used.

SUMMARY OF THE INVENTION

The present invention relates to recovering oil from a subterranean formation by surfactant flooding and addresses the previously recited desirable features and also provides other benefits obvious to the ordinary skilled artisan. The process is especially useful when the reservoir oil has high wax contents, e.g., greater than 20 volume percentage wax, wherein the wax is a parafine with 20 or higher carbon number. A method of recovering crude oil from a subterranean formation which comprises: (a) injecting into said formation an aqueous solution containing an effective amount of alkylaryl sulfonate surfactant, said sulfonate prepared by alkylating aromatic compounds with an alpha-olefin stream having a broad distribution in olefin carbon numbers, sulfonating and then neutralizing the resulting alkylate, and (b) displacing said solution through the formation to recover hydrocarbons from a production well. The invention also relates to an alkylaryl sulfonate composition wherein the alkyl has a broad range of carbon chain lengths greater than 10, preferably 12 to 58. More preferably 12 to 40 or also more preferably 12 to 32 and an aryl of benzene, ethylbenzene, toluene, or xylene wherein a major proportion is preferably a xylene.

DETAILED DESCRIPTION OF THE INVENTION

In a practice of the current invention, the C10 bottoms of an alpha-olefin plant were reacted with aromatic compounds, such as toluene to form alkylates, which are subsequently sulfonated with SO3 and neutralized to sodium salts. This surfactant is designated as TS12+.

In another practice, one can utilize only the C10 to C24 alpha-olefins. This would be especially useful for lighter oil and higher salinity. This surfactant is designated as CR1.

In another practice, mixed xylene is alkylated with C10 bottoms, i.e., carbon chains greater than C10 such as C12–C30 of an alpha-olefin plant, using AlCl3 as catalyst, and subsequently sulfonated and neutralized. Additionally and/or alternatively C10 buttoms can be C12+ of an alpha olefin plant including the NAO stream. Such a stream includes C30+ to C58. The upper heavier range C30+ to C58 may comprise up to about 10% of the alkyl groups. This surfactant is designated as XS12+. An example is a C12–C30+ alkyl chain wherein the aryl group is about 90% xylene and the other 10% is benzene, toluene, and ethylbenzene. The meta xylene compounds having varying alkyl chain lengths approach 50% of the mixture. A specificaily preferred XS12+ includes C12–C30 alkyl groups on aryls wherein the benzene is about 1.6%, toluene is about 1.1%, ethylbenzene is about 6.8%, p-xylene is about 13.8%, m-xylene is about 48.8% and o-xylene is about 27.9%. A most specifically preferred XS12+ includes C12–C30+ alkyl chain length wherein the aryl group is greater than 90% o-xylene and the other 10% is a mixture of meta-xylene and para-xylene. Additionally and/or alternatively the composition can be C12+ bottoms from mixed xylenes containing about 50% ortho and optionally up to substantially all ortho species In yet another practice, the xylene stream is alkylated with C10 bottoms of an alpha-olefin plant, using HF as catalyst, and subsequently sulfonated and neutralized. This surfactant is designated as CR2.

The use of xylene as the aromatic compound for alkylation is especially preferred for applications with heavier reservoir oil, lower salinity, and higher temperature. While not described here, one can certainly use a mixture of benzene, toluene, and xylene of various fractions to optimize for a specific reservoir application or to take advantage of the aromatics market conditions.

Regardless of the above variations, one of the key elements of the present invention is the use of a broad distribution of alpha-olefins greater than C10 to C58 or more, or preferably the entire C10 bottoms fraction, i.e., greater than C10 of an alpha olefin (AO) process. Suitable ranges are C12 to C40 preferably ranges such as C10 to C32; C12 to C28; and C10 to C24. In contrast, conventionally used alkylaryl sulfonates generally focus on a narrow range of olefin carbon numbers, such as C12 xylene sulfonate (C12XS), C16 toluene sulfonate (C16TS), C18 toluene sulfonate (C18TS), and C20–24 toluene sulfonate (C20–24TS). Other carbon chain lengths made during the reaction must be separated out. This adds to the cost of the specifically used product.

While conventional alkylaryl sulfonates are quite adequate in dealing with light oils or short alkanes, from octane to hexadecane, they fail entirely when dealing with heavier crude oils, particularly those with a high wax content. With these oils, the phase behavior is abnormal, i.e., the conventional lower- to middle- to upper-phase microemulsion transition as salinity increases no longer occurs. Instead, the middle-phase either exists as a liquid crystal phase with very low solubilization, typically less than 5, or does not exist at all between the lower- to upper-phase transition as salinity increases from about 3,000 ppm to about 30,000 ppm.

Surprisingly, using the surfactants disclosed in this invention, the phase behavior with high-wax crude becomes normal again. Moreover, the solubilization near the optimal salinity is quite high, often exceeds 40 as opposed to about 5 or lower. Higher solubilization corresponds to lower interfacial tension between oil and surfactant solution, which is the basis for enhanced oil recovery by surfactant floods.

Ranges for surfactant are from 0.5% to 3.0%, preferably 0.5% to 2.0%, and most preferably 1.0% to 1.5%. The surfactant molecular weight is a mixture from 320 to 650. The cosurfactant is from 0.1% to 1.5%, preferably 0.25% to 1.25%, and most preferably 0.50% to 0.75% with the rest to 100% being water. An alcohol such as sec-butanol and the like is suitable cosurfactant. The percentages are by volume. By effective amount, it is meant that the total aqueous injected composition is from 10 percent or more of the pore volume of the hydrocarbon bearing formation rock to be swept, preferably more than 25 percent to 100 percent or more.

This surfactant is used in a basic, brine solution in combination with a conventional cosurfactant to increase the recovery of crude oil from reservoirs. The most preferred active EOR Surfactant is the sodium salt of an alkyl ortho-xylene sulfonic acid.

A preferred overall synthesis of the preferred alkyl EOR Surfactant such as the xylene sulfonate involves three steps: alkylation, sulfonation and neutralization.

The alkylation step involves alkylation of most preferably an ortho-xylene with a mixture of normal alpha-olefins (C12–C30+) using aluminum tricholoride (AlCl3) catalysis to form an alkyl ortho-xylene alkylate. The process is performed in a continuous alkylation plant in which the ortho-xylene makeup is distilled and recycled. Addition makeup ortho-xylene is also added during the process. Under the alkylation conditions, some ortho-xylene is isomerized to meta-xylene and consequently the final alkylation product, or alkylate, may contain in the range of 1% to 5% alkylate derived from alkylation of meta-xylene. Toll manufacturers such as Pilot Chemical Company are suitable sources for the alkylated product.

The sulfonation step involves sulfonating the alkylate in a continuous thin film reactor with SO3/Air to form a sulfonic acid product (SA).

The process parameters used in the sulfonation step in a small-scale sulfonation pilot plant are as follows:

| Alkylate Feed Rate (gm/minute) | SO2 Rate (liters/hour) | Air Rate (liters/hour) | Temperature (° C.) |
|---|---|---|---|
| 4.5–4.6 | 14–18 | 192 | 60 |

The process parameters used in a full-scale sulfonation plant are scaled accordingly.

The neutralization step involves mixing the SA product with aqueous sodium hydroxide to form a sodium sulfonate. The reaction is exothermic and the viscosity of the mixture is dependent on the amount of water present.

The following table illustrates the much higher solubilization capacity of the present invention than conventional alkylaryl sulfonates. In each case an aqueous solution containing 1.5% surfactant and 0.5% sec-butanol as a cosurfactant is mixed with equal volumes of oil and equilibrated at 210° F.

TABLE 1

Solubilization Capacity and Optimal Salinity with a High-Wax Crude Oil

| Surfactant | Optimal Salinity | Solubilization |
|---|---|---|
| CR1 | 2.6% NaCl | 15 |
| CR2 | 1.3% NaCl | 40 |
| TS12 + | 2.0% NaCl | 30 |
| XS12 + | 0.7% NaCl | 45 |
| C12XS | 1.6% NaCl | 2 |
| C16TS | 2.1% NaCl | 1 |
| C18TS | 1.9% NaCl | 1 |
| C2024TS | 1.6% NaCl | 2 |

The above table illustrates the superiority of CR1, and TS12+ and particularly XS12+ and CR2 over a narrow or unique carbon chain length.

While not bounded by theory, a probable cause for the benefits of the present invention is that the phase behavior of alkylaryl sulfonates with a broad distribution in alkyl chain lengths is insensitive to variations in oil chain length. As illustrated in the following table, the optimal salinity of CR2 increases only slightly while that of a pure alkylaryl sulfonate, C12XS, more than doubled as oil chain length increases from 10 to 16.

TABLE 2

Optimal Salinity with Alkane Oils at 75° F.

| | Optimal Salinity, % NaCl | |
|---|---|---|
| Alkane Carbon Number | C12XS | CR2 |
| 10 | 1.2 | 1.4 |
| 12 | 1.6 | 1.5 |
| 14 | 2.1 | 1.55 |
| 16 | 2.6 | 1.6 |

Another benefit of the present invention is that the stability of aqueous surfactant solution improves. With conventional alkylaryl sulfonates, the salinity above which the surfactant solution becomes unstable at ambient temperature is often lower than their optimal salinity for phase behavior with oil. For example, the C18TS is only stable to 0.4% NaCl at 75° F. while its optimal salinity with crude oil is 19% NaCl. This makes it impractical to use aqueous solution of C18TS for surfactant floods even if it could generate adequate phase behavior and interfacial tension with oil under reservoir conditions. In contrast, XS12+ is stable to 1% NaCl at 75° F., while its optimal salinity with crude oil is 0.7% NaCl at 210° F. Thus, there are no operational problems when preparing and injecting the aqueous surfactant solution under ambient conditions. Thus precise controls are less important, and specialized training and measurements and monitoring during injection can be reduced or avoided.

From an economics point of view, the present invention has significant advantages over conventional alkylaryl sulfonates. In commercial applications of surfactant floods, the quantity of surfactant required is huge, often exceeds 100 million pounds lbs. If only a narrow fraction of the alpha-olefins are used to make the surfactant, the required olefin plant capacity would exceed a few billion pounds, which is not presently available. While one can build a new plant to meet the demand of the surfactant flood, the unused olefin fractions cannot be readily used for other purposes and, therefore, must be accounted for in the cost of the olefin feedstocks for the surfactant. Thus the present alkylaryl sulfonate composition and process invention permits better use of the whole spectrum of an AO plants products. Since the current alpha-olefin market is largely driven by the demand in C10 and lower fractions use in plastic production such as polyethylene and/or polypropylene, the use of C10 bottoms (i.e., C12 and higher fractions) in the present invention does not pose a conflict or tradeoff. It actually provides for a more synergistic use of the plants total output. In fact, taking the entire C10 bottoms, i.e., C12 and higher, would eliminate many costly fractionation steps, thus further lowering the cost of the alpha-olefin feedstock for the surfactant.

The invention was described with respect to particularly preferred embodiments. Modifications within the scope of the ordinary skilled artisan, e.g., the use of branched alkyl chains and mixture of aryls and particularly o-xylene alkylate(s), are within the scope of the invention and the appended claims.

What is claimed is:

1. A method of recovering crude oil from a subterranean hydrocarbon containing formation which comprises (a) injecting into said formation an aqueous solution containing an effective amount of alkylaryl sulfonate, surfactant prepared by alkylating aromatic compounds with an alpha-olefin stream having a broad distribution in olefin carbon numbers, the olefin stream is the carbon chain $C_{10}$ bottoms of a commercial ethylene synthesis alpha-olefin reactor and comprises $C_{10+}$ through $C_{58}$ carbon chain fractions, and wherein the aromatic alkyl compound is selected from the group consisting of benzene, tuolene, xylene, or mixtures thereof, sulfonating and then neutralizing the resulting alkylate, and (b) displacing said solution into the formation to recover hydrocarbons from a production well.

2. The method of claim 1 wherein said olefin stream is a combination of individual olefin fractions having a carbon chain of from about $C_{12}$ to about $C_{40}$.

3. The method according to claim 1 wherein the aryl compound is o-xylene and wherein the injection wells and production wells are selected from the group consisting of the same well, different wells or combinations thereof.

4. The method of claim 1 wherein alkylation is conducted with AlCl3 or HF-based catalyst.

5. The method of claim 1 wherein said surfactant has substantially the same phase behavior with different alkane oils.

6. The method of claim 1 wherein said surfactant has substantially the same phase behavior over a temperature range from 120° to 210° F.

7. The process according to claim 1 wherein the injection and prodution wells are the same or different.

8. In a process of recovering hydrocarbons from a subterranean hydrocarbon bearing formation using an alkylaryl sulfonate as a surfactant, the improvement which comprises using an alkylaryl sulfonate mixture wherein the alkyl chain includes $C_{10}$ to $C_{24}$ carbon chain lengths and wherein the carbon chain is straight, branced or mixtures thereof, and wherein the aryl group is a xylene and having a greater than 85% ortho-xylene content.

9. An alkylaryl sulfonate enhanced oil recovery surfactant composition which comprises a sulfonate of a $C_{10+}$ to $C_{58}$ alkyl carbon chain length distribution, with an aryl group selected from ethyl benzene, xylene, toluene, or mixtures thereof, and wherein greater than 50% of the aryl is an ortho-, meta-, or para-xylene, the surfactant having a mixture molecular weight of from 320 to 650 and a solubilization greater than about 5 with a waxy crude oil.

10. The composition according to claim 9 wherein the aryl is 85% or greater o-xylene and the remainder is meta- and para-xylene.

11. The composition according to claim 10 wherein the aryl is 90% ortho-xylene.

12. The composition according to claim 11 wherein the composition has a solubilization greater than about 5 with a waxy crude oil.

13. The composition according to claim 9 wherein the aryl is about 50% alkyl substituted meta-xylene.

* * * * *